(12) United States Patent
McCabe et al.

(10) Patent No.: US 8,344,293 B1
(45) Date of Patent: Jan. 1, 2013

(54) SOLAR-POWERED THERMAL INSULATING TAPE (76) Inventors: Jared J. McCabe, McAlester, OK (US); Jason McCabe, McAlester, OK (US)

( * ) Notice: Subject to any disclaimer, the term of this patent is extended or adjusted under 35 U.S.C. 154(b) by 569 days.

(21) Appl. No.: 12/569,000

(22) Filed: Sep. 29, 2009

Related U.S. Application Data (60) Provisional application No. 61/194,505, filed on Sep. 29, 2008.

(51) Int. Cl.
*B23K 13/08* (2006.01)
(52) U.S. Cl. .................................................. 219/482
(58) Field of Classification Search .................. 219/482; 137/341
See application file for complete search history.

(56) References Cited

U.S. PATENT DOCUMENTS

| | | | |
|---|---|---|---|
| 3,275,803 A | 9/1966 | True | |
| 4,056,094 A | 11/1977 | Rosenberg | |
| 4,172,441 A | 10/1979 | Newton | |
| 4,214,147 A | 7/1980 | Kraver | |
| 4,368,725 A | 1/1983 | McClintock | |
| 4,558,206 A | 12/1985 | Ball | |
| 4,802,829 A * | 2/1989 | Miller | 417/12 |
| 5,791,377 A | 8/1998 | LaRochelle | |
| 5,933,574 A | 8/1999 | Avansino | |
| 6,069,997 A * | 5/2000 | Adar et al. | 392/472 |
| 6,727,481 B1 | 4/2004 | Wilds | |
| 6,770,848 B2 | 8/2004 | Haas et al. | |
| 7,900,650 B1 * | 3/2011 | Wilson | 137/601.14 |
| 2006/0130481 A1* | 6/2006 | Browe | 60/641.8 |
| 2007/0107298 A1* | 5/2007 | Miao et al. | 43/113 |
| 2007/0245755 A1* | 10/2007 | Galvez-Ramos | 62/235.1 |

FOREIGN PATENT DOCUMENTS

CH 659124 A5 * 12/1986

* cited by examiner

*Primary Examiner* — Huan Hoang
*Assistant Examiner* — Min Huang
(74) *Attorney, Agent, or Firm* — Montgomery Patent & Design LLC; Robert C. Montgomery (57) ABSTRACT

A solar-powered heat tape system for gas well regulators and other remotely located equipment is herein disclosed. The system comprises a solar power panel mounted atop a mast which provides electrical power to a rechargeable battery system through a charge controller. The output power of the battery is then routed through an AC power inverter. The AC power is then routed to a length of electrical heat tape that is used the keep gas regulators and other equipment from freezing during cold weather. All major electrical components with the exception of the solar panel and the heat tape are contained in a weatherproof and lockable electrical cabinet. The system thus provides electrical power at remote locations to protect plumbing, miscellaneous equipment, testing equipment, telemetry equipment, and the like from freezing.

16 Claims, 5 Drawing Sheets

SOLAR-POWERED THERMAL INSULATING TAPE

RELATED APPLICATIONS

The present invention was first described in and claims the benefit of U.S. Provisional Application No. 61/194,505, filed Sep. 29, 2008, the entire disclosures of which are incorporated herein by reference.

FIELD OF THE INVENTION

The present invention relates generally to apparatuses designed for the heating of pipes, and in particular, to a thermal insulating tape powered by solar means intended for use in the heating of pipes.

BACKGROUND OF THE INVENTION

Many types of industrial equipment rely on specific settings and environmental conditions to function. Among the factors than can affect the performance of mechanical and electrical devices, temperatures is one of the most important. Temperatures low enough to cause freezing can wreak havoc on almost any device, especially those such as gutters and pipes. Electric heat tracing is commonly used to prevent freezing, maintain process temperatures, and protect products. However, electric heat tracing requires a source of electrical power in order to operate. While this is not a problem in many home and industrial settings, the use of such devices in remote locations such as gas wells is very difficult to accomplish.

Various attempts have been made to provide systems for the heating of pipes and other such equipment. Examples of these attempts can be seen by reference to several U.S. patents. U.S. Pat. No. 3,275,803, issued in the name of True, describes a pipe heating apparatus. The True apparatus is a prefabricated, electrical device to prevent the freezing of water pipes.

U.S. Pat. No. 4,172,441, issued in the name of Newton, describes solar heat collector panel. The Newton panel is designed to heat water or another fluid pumped through a single sinuous conduit.

U.S. Pat. No. 4,214,147, issued in the name of Kraver, describes a system for preventing freezing and condensation in pipes. The Kraver system comprises a tubular enclosure for a pipe which provides air-blanket insulation.

While these devices fulfill their respective, particular objectives, each of these references suffer from one or more of the aforementioned disadvantages. Many such devices are not adapted for various types and shapes of equipment. Also, many such devices require access to an electrical outlet in order to function. Furthermore, many such devices which employ solar power are not designed to interface with standard heat tape technology. Accordingly, there exists a need for a pipe heating system and method without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a means to provide temperature regulation and frost protection for equipment at remote locations without necessary access to an external electrical power source. Thus, the object of the present invention is to solve the aforementioned disadvantages and provide for this need.

To achieve the above objectives, it is an object of the present invention to provide a system for solar-powered heat tape, which comprises a solar panel, a mast, a power distribution box, a heat tape unit, and an insulating cover.

Another object of the present invention is to provide a solar panel, which comprises a conventional rectangular photovoltaic unit rate at approximately eighty (80) Watts, although other sizes and power output ratings may be used based upon particular applications. The solar panel further comprises a panel mounting arm which allows for adjustment and positioning.

Yet still another object of the present invention is to provide a panel mounting arm, which acts as an attachment means between the solar panel and a vertical tubular mast. The mast extends approximately eight (8) to ten (10) feet downward from the solar panel to grade surface.

Yet still another object of the present invention is to provide a mast, which comprises a round structural tubing approximately three (3) inches in diameter and buried into the grade surface approximately two (2) to three (3) feet based on frost conditions. The mast provides an attachment means for a power distribution box mounted in an intermediate position.

Yet still another object of the present invention is to provide a power distribution box, which comprises a protective enclosure for the power conditioning and electrical storage equipment. The power distribution box further comprises an enclosure, an access door, a hasp, and a lock.

Yet still another object of the present invention is to provide an access door and lock to provide a security means for the enclosure.

Yet still another object of the present invention is to provide an access door, which comprises a common side-hinged panel having a waterproof seal and a locking hasp.

Yet still another object of the present invention is to provide a lock, which comprises a common key or combination removable locking unit. The lock works in conjunction with the hasp to hold the access door closed in the usual manner.

Yet still another object of the present invention is to provide a heat tape unit, envisioned to be a common commercially available 110-volt resistor wire-type pipe heating cable, which further comprises an inline thermal switch. The heat tape unit is envisioned to have a power consumption rating of approximately eighty (80) Watts, although various lengths and power ratings may be provided based on particular applications.

Yet still another object of the present invention is to apply the heat tape unit in a conventional non-crossing spiral pattern around various equipments such as pressure regulators, valves, etc. Additional, an insulating cover is wrapped around the outside surface of the equipment and installed heat tape in a waterproof manner.

Yet still another object of the present invention is to provide a power distribution box, which comprises a standard electrical enclosure, a plurality of interconnecting wiring, a hasp fixture, a charge controller, a battery, an inverter, an ON/OFF switch, and a heat tape male plug.

Yet still another object of the present invention is to provide an enclosure, which comprises a standard metal or plastic weatherproof, lockable rectangular electrical enclosure. The enclosure is attached to the mast using standard "U"-bolt fixtures and fasteners.

Yet still another object of the present invention is to further comprise the enclosure of a protective housing and an attachment means along interior surfaces for the charge controller and inverter. The controller and inverter are affixed in panel-mount fashion to a rear surface of the enclosure.

Yet still another object of the present invention is to provide a charge controller, which comprises a common commercially available unit for providing regulation of variable input voltage from the solar panel. The charge controller provides constant 12-volt DC voltage to the battery terminal portion of the rechargeable battery.

Yet still another object of the present invention is to provide an inverter, which comprises a commercially available unit designed to convert 12-volt DC voltage from the battery into 110-volt AC voltage. The inverter is to have an approximate power rating of four hundred (400) watts.

Yet still another object of the present invention is to further comprise the inverter of an integral standard duplex electrical outlet intended to supply power to a standard 110-volt AC heat tape via a common three prong male plug. The outlet may also provide power to various other equipment such as testing equipment, telemetry equipment, etc.

Yet still another object of the present invention is to provide an external ON/OFF switching means, which allows for manual deactivation of the system during warm seasons if desired. The switch may also be located internally within the enclosure to prevent tampering.

Yet still another object of the present invention is to provide a battery within the enclosure, which comprises a deep-cycle type unit capable of withstanding frequent charge/discharge cycles. The battery further comprises positive and negative terminals capable of providing a constant flow of electrical power to an eighty (80) Watt heat tape unit for three to four days without recharge.

Yet still another object of the present invention is to provide a means to maximize solar energy collection, which comprises a solar panel mounting arm, an azimuth adjustment bracket, and a mast.

Yet still another object of the present invention is to provide a panel mounting arm, which comprises a tubular metal weldment having a "Y" shape and extending upward along a rear surface of the solar panel. The panel mounting arm is secured to the solar panel using a plurality of "U"-shaped panel brackets and common fasteners.

Yet still another object of the present invention is to provide an azimuth adjustment bracket, which enables positioning of the solar panel angularly with respect to a vertical center as well as radially along a horizontal plane. The bracket comprises a channel-shaped bracket with two (2) upwardly extending opposing leg portions which provide an attachment and positioning means to the panel mounting arm.

Yet still another object of the present invention is to further comprise the azimuth adjustment bracket of a cylindrical bottom opening to receive a top portion of the tubular mast. This allows the bracket to be rotated on the mast in order to face a desired direction for maximum solar exposure.

Yet still another object of the present invention is to provide a pivot pin, which angularly guides the panel mounting arm. The pivot pin extends horizontally through the azimuth adjustment bracket and panel mounting arm.

Yet still another object of the present invention is to further comprise the panel mounting arm of a pair of opposing locking fasteners and respective adjustment slots. This allows the panel mounting arm to be moved in forward and rearward manners and to be secured to the azimuth adjustment bracket.

Yet still another object of the present invention is to provide an insulating cover, which provides a means to retain and direct heat generated by the heat tape unit. The insulating cover comprises an insulating layer and a waterproof sealing tape layer.

Yet still another object of the present invention is to provide an insulating layer, which comprises common fiberglass batt material or another equivalent pliable material capable of being wrapped tightly around the equipment. The insulating layer is intended to be in direct contact with the equipment and heat tape.

Yet still another object of the present invention is to provide a sealing tape layer, which comprises an adhesive backed plastic or metallized tape as a means to secure the insulating layer and provide a waterproof outer layer over the insulating cover.

Yet still another object of the present invention is to provide a thermal switch, which automatically closes once the ambient air temperature drops below a preset threshold temperature. This enables the 110-volt current to flow from the inverter to the heat tape, thereby preventing freezing of protected equipment.

Yet still another object of the present invention is to provide a unique means of installing and utilizing the system in a manner which provides for reliable frost protection for equipment and which is simple, easy and effective.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 solar-powered thermal insulating tape
20 solar panel
22 panel mounting arm
23 panel bracket
25 mast
27 box mounting fixture
29 ON/OFF switch
30 power distribution box
31 enclosure
32 wiring
33 lock
34 tie-wrap
35 hasp
36 charge controller
37 battery
38 inverter
39 male plug 40 access door
42 electrical outlet
50 heat tape unit
51 thermal switch
55 battery terminal
60 azimuth adjustment bracket
62 pivot pin
64 adjustment slot
68 fastener
100 equipment
110 grade surface
120 insulating cover
122 insulating layer
125 sealing tape layer

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a solar-powered thermal insulating tape and method of use thereof (herein described as the "system") 10, which provides a stand-alone thermal protection system to prevent freezing of various remotely located outdoor equipment 100 such as plumbing, fixtures, gas well regulators, and the like. The system 10 is powered by a solar panel 20 mounted atop a mast 25. The solar panel 20 feeds electrical power to a rechargeable battery 37 housed within an electrical enclosure 31. Output current from the battery 37 is then routed through an inverter 38 and thereto a conventional electrical heat tape unit 50 which is wrapped around various equipment 100 to prevent freezing during cold weather. The system 10 thus provides electrical power at remote sites and may also provide power thereto various other equipment such as testing equipment, telemetry equipment, and the like, via an electrical outlet 42.

Figure 1:
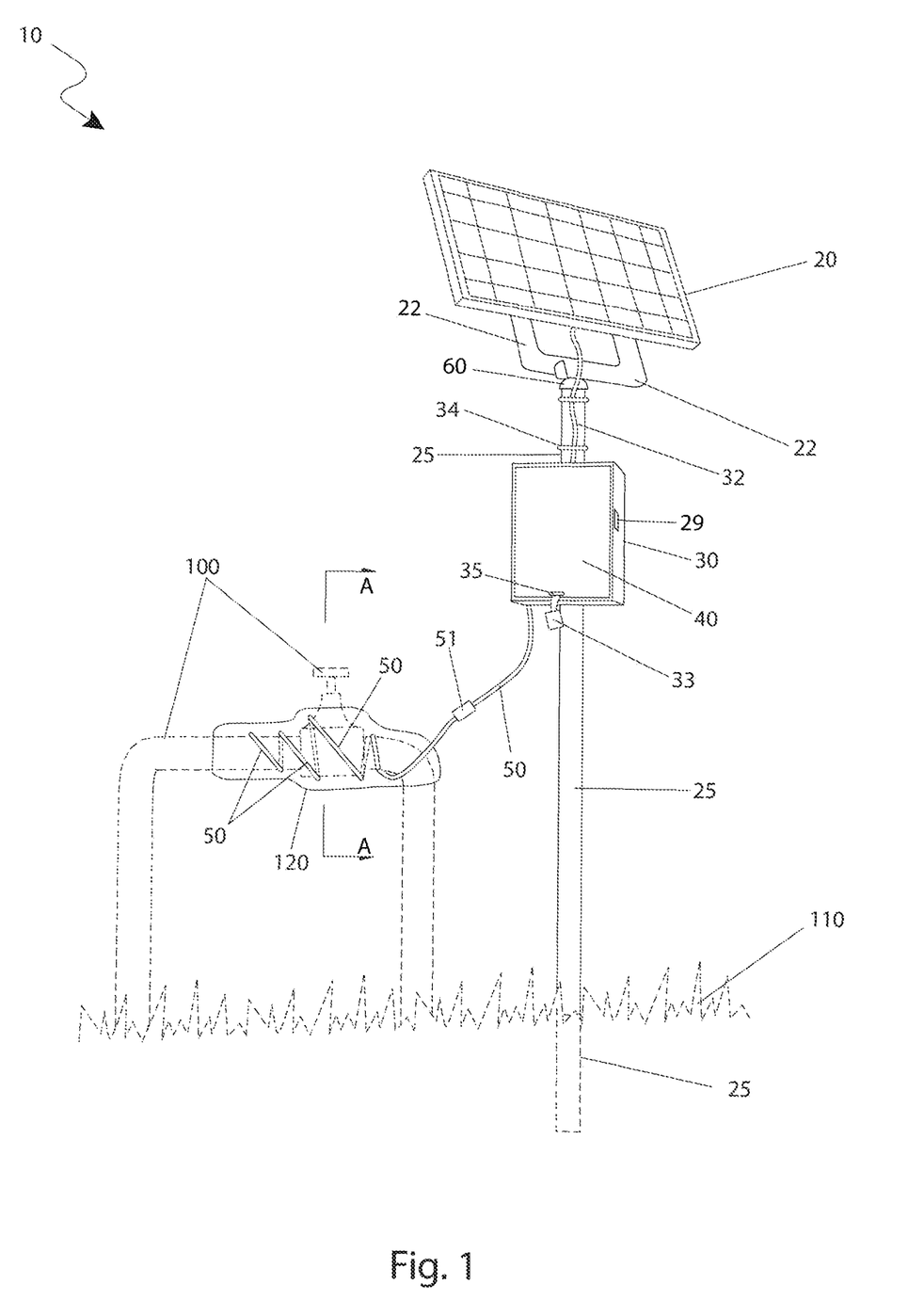
FIG. 1 is an environmental view of a solar-powered thermal insulating tape 10, according to a preferred embodiment of the present invention.

Referring now to FIG. 1, an environmental view of the system 10, according to the preferred embodiment of the present invention, is disclosed. The system 10 comprises a solar panel 20, a mast 25, a power distribution box 30, a heat tape unit 50, and an insulating cover 120. The solar panel 20 comprises a conventional rectangular photovoltaic unit rated at approximately eighty (80) Watts; however, final selection of a particular solar panel 20 size and corresponding power output rating may vary based upon particular applications which may require less or greater amounts of produced energy, and as such should not be interpreted as a limiting factor of the invention 10. The solar panel 20 further comprises a mounting means which provides directional adjustment and positioning of the solar panel 20 (see FIG. 3). A panel mounting arm 22 provides an attachment means therebetween the solar panel 20 and a vertical tubular mast 25. The mast 25 extends downwardly therefrom the solar panel 20 approximately eight (8) to ten (10) feet to a grade surface 110, thereby providing an elevated position for the solar panel 20. The mast 25 is made using round structural tubing approximately three (3) inches in diameter and is buried thereinto the grade surface 110 approximately two (2) to three (3) feet based upon anticipated frost conditions. The mast 25 also provides an attachment means thereto a power distribution box 30 being mounted thereto at an intermediate position. The power distribution box 30 provides a protective enclosure thereto various power conditioning and electrical storage equipment which provides 110-volt DC output power thereto the heat tape unit 50 (see FIG. 2). The power distribution box 30 comprises an enclosure 31, an access door 40, a hasp 35, and a lock 33. Said access door 40 and lock 33 provide a security means for the enclosure 31. The access door 40 comprises a common side-hinged panel having a water-proof seal and a locking hasp 35 located therealong a bottom edge. The lock 33 comprises a common key or combination removable locking unit which works in conjunction therewith the hasp 35 to hold the access door 40 therein a closed state in an expected manner.

The heat tape unit 50 is envisioned to be a common commercially available 110-volt resistor wire-type pipe heating cable which is provided in different lengths and further comprises an in-line thermal switch 51. The heat tape unit 50 is envisioned to have a power consumption rating of approximately eighty (80) watts; however, various heat tape lengths and corresponding power ratings may be provided based upon particular heating applications which may require less or greater amounts of thermal energy. The heat tape unit 50 is envisioned to be wrapped in a conventional non-crossing spiral pattern therearound various equipment 100 such as, but not limited to: pressure regulators, valves, miscellaneous equipment, plumbing, and the like, thereby providing protection from freezing. Finally, an insulating cover 120 is wrapped therearound an outside surface of the equipment 100 and installed heat tape unit 50 using water-proof insulating materials 120 (see FIG. 4).

Figure 2:
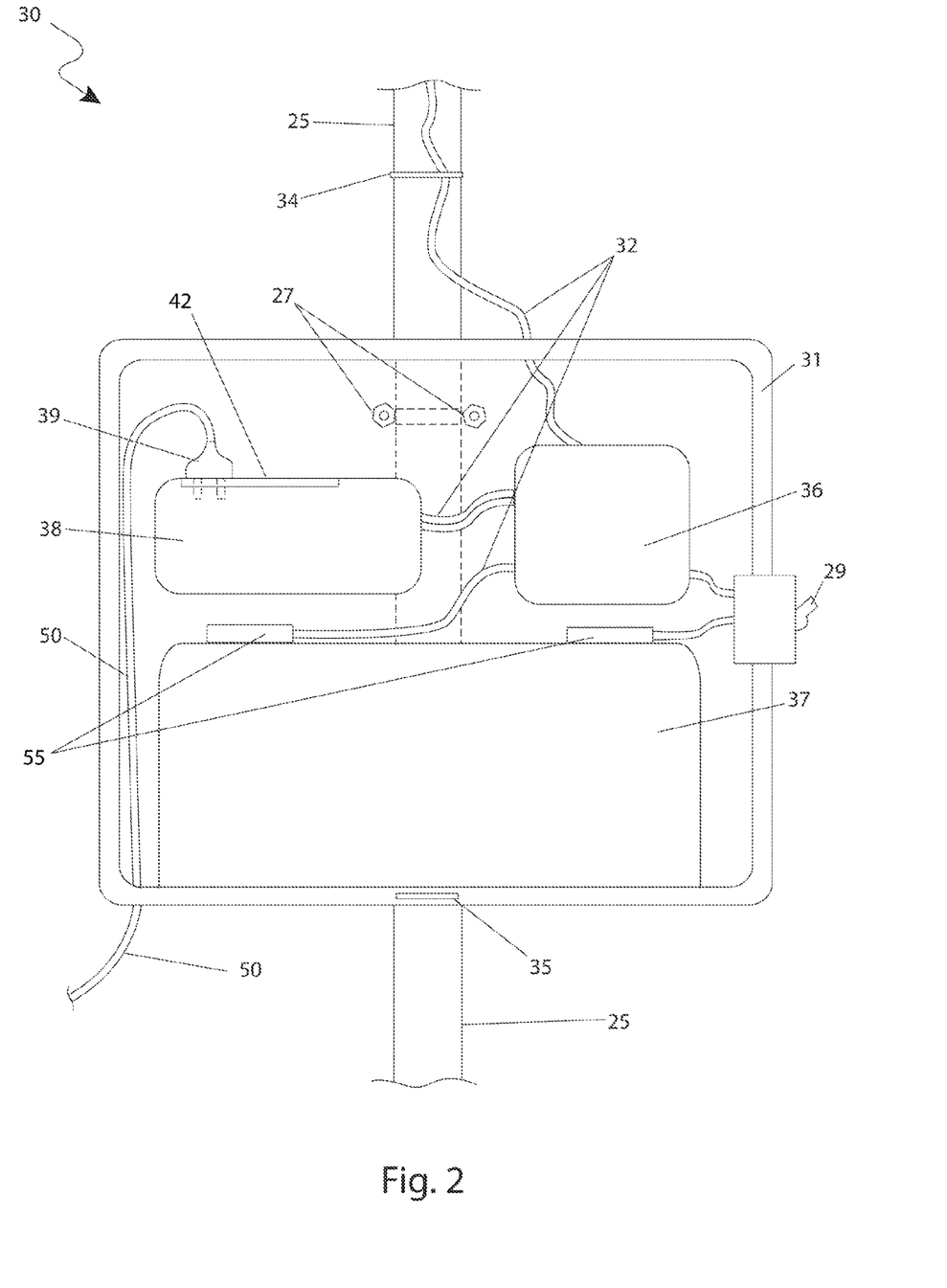
FIG. 2 is a close-up view of a power distribution box portion 30 of the solar-powered thermal insulating tape 10, according to a preferred embodiment of the present invention.

Referring now to FIG. 2, a close-up view of a power distribution box portion 30 of the system 10, according to the preferred embodiment of the present invention, is disclosed. The power distribution box portion 30 comprises a standard electrical enclosure 31, a plurality of interconnecting wiring 32, a hasp fixture 35, a charge controller 36, a battery 37, an inverter 38, an ON/OFF switch 29, and a heat tape male plug 39. The enclosure 31 comprises a standard metal or plastic weatherproof and lockable rectangular electrical enclosure 31 having approximate dimensions of sixteen (16) inches wide, eighteen (18) inches high, by ten (10) inches deep. The enclosure 31 is attached thereto the mast 25 using standard "U"-bolt mounting fixtures 27 and fasteners. The enclosure 31 provides a protective housing and an attachment means along interior surfaces thereto the charge controller 36 and inverter 38, being affixed thereto in a panel-mount fashion thereto a rear surface of the enclosure 31. The charge controller 36 is envisioned to comprise a common commercially available unit which provides regulation of variable input voltage received therefrom the solar panel 20, thereby providing constant 12-volt direct current (DC) voltage thereto battery terminal portions 55 of the rechargeable battery 37. The inverter 38 is also envisioned to be a commercially available unit providing conversion of 12-volt DC voltage therefrom the battery 37, thereinto 110-volt AC voltage. The inverter 38 is to have an approximate power rating of four-hundred (400) watts. The inverter 38 further comprises an integral standard duplex electrical outlet 42 to supply power thereto a standard 110-volt AC heat tape unit 50 being plugged thereinto via a common three (3) prong male plug 39. The electrical outlet 42 may also provide power in like manner thereto various other equipment such as testing equipment, telemetry equipment, and the like, when needed.

The system 10 is depicted here in a preferred embodiment having an external ON/OFF switching means 29 for manual deactivation of the system 10 during warm seasons if so desired; however, it is envisioned that the system 10 may also be provided with an ON/OFF switch 29 being located internally within the enclosure 31, thereby preventing possible tampering therewith.

The enclosure 31 also houses a battery 37 which is envisioned to comprise a deep-cycle type unit commonly used in marine applications being capable of withstanding frequent charge/discharge cycles. The battery 37 comprises normal positive and negative battery terminals 55 capable of providing a constant flow of electrical power to an eighty (80) watt heat tape unit 50 for three (3) to four (4) days without a recharge. The charge controller 36, battery 37, and inverter 38 are in electrical communication therewith one another via common interconnecting copper wiring 32 in an expected manner (see FIG. 5).

Figure 3:
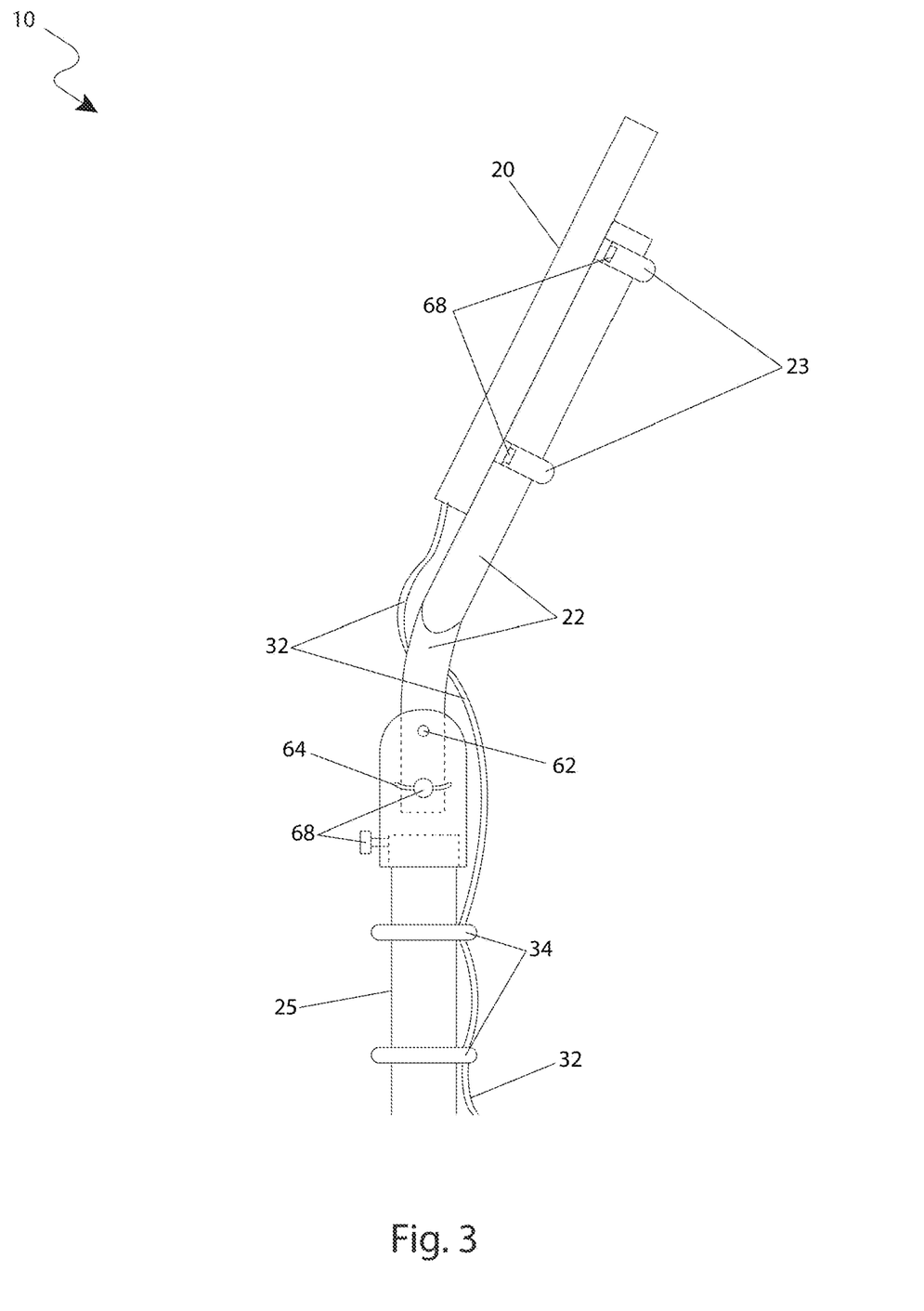
FIG. 3 is a side view of an azimuth adjustment bracket portion 60 of the solar-powered thermal insulating tape 10, according to a preferred embodiment of the present invention.

Referring now to FIG. 3, a side view of an azimuth adjustment bracket portion 60 of the system 10, according to a preferred embodiment of the present invention, is disclosed. The system 10 provides a means to maximize solar energy collection by the solar panel 20 via a solar panel mounting arm 22, an azimuth adjustment bracket 60, and a mast 25. The panel mounting arm 22 comprises a tubular metal weldment having a "Y" shape and extending upwardly therealong a rear surface of the solar panel 20. The panel mounting arm 22 is secured thereto the solar panel 20 using a plurality of "U"-shaped panel brackets 23 being affixed thereto using common fasteners 68. The azimuth adjustment bracket 60 enables positioning of the solar panel 20 both angularly with respect thereto a vertical center, and radially along a horizontal plane. The azimuth adjustment bracket 60 comprises a channel-shaped bracket having two (2) upwardly extending opposing leg portions which provide an attachment and positioning means thereto the panel mounting arm 22. The panel mounting arm 22 and attached solar panel 20 are pivoted thereto a desired azimuth angle by rotating a lower portion of the panel mounting arm 22 therewithin the channel portion of the azimuth adjustment bracket 60. Said panel mounting arm 22 is angularly guided via a pivot pin 62 which extends horizontally therethrough the azimuth adjustment bracket 60 and said panel mounting arm 22. Said panel mounting arm 22 is motioned in a forward and rearward manner and secured thereto the azimuth adjustment bracket 60 using a pair of opposing locking fasteners 68 being inserted therethrough respective adjustment slots 64.

The azimuth adjustment bracket 60 further provides directional positioning of the solar panel 20. Said azimuth adjustment bracket 60 further comprises a cylindrical bottom opening so as to insertingly receive a top portion of the tubular mast 25. The azimuth adjustment bracket 60 may be rotated thereupon the mast 25 allowing the solar panel 20 to face in a desired direction for maximum solar exposure and is subsequently secured in position using a locking fastener 68.

Figure 4:
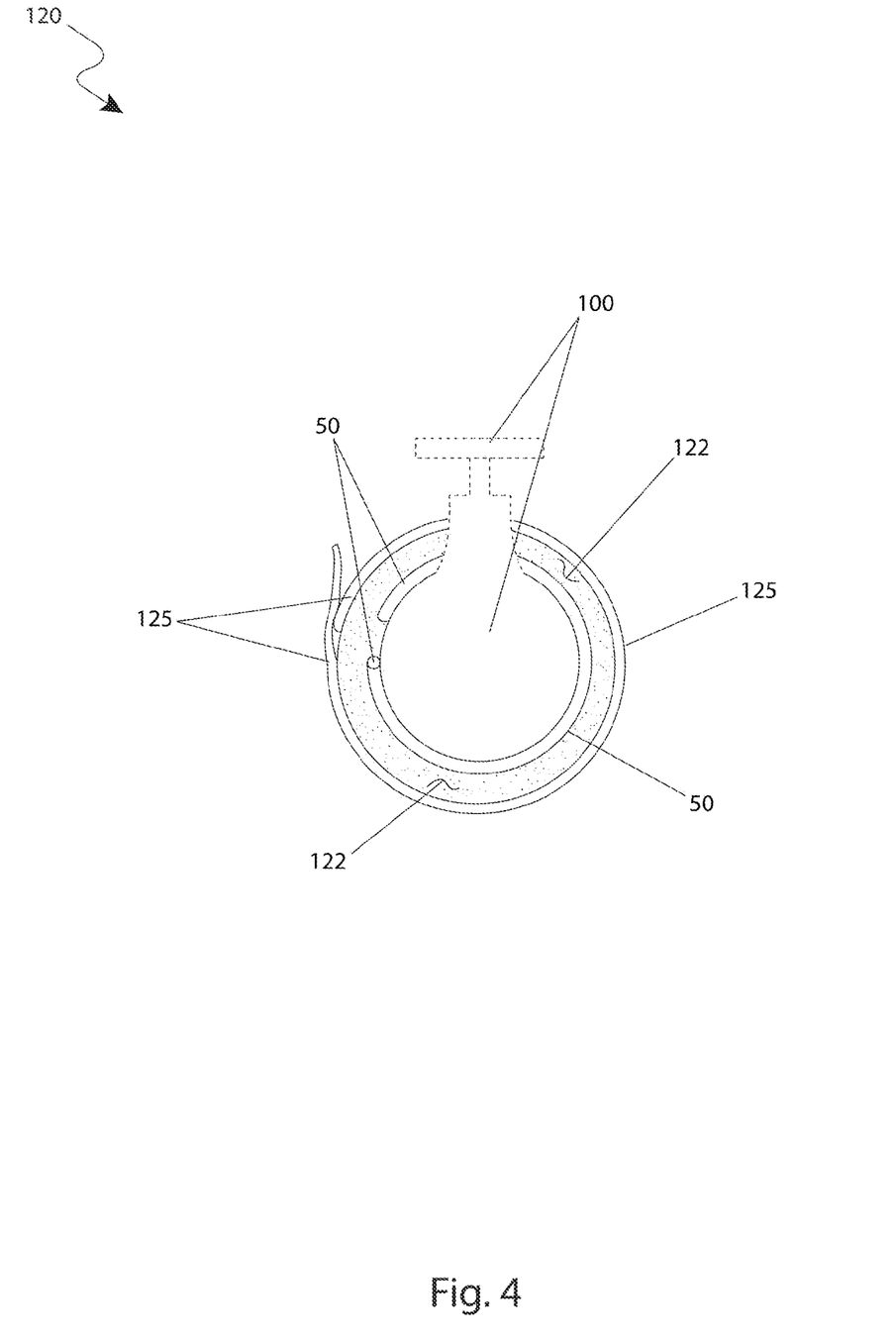
FIG. 4 is a section view of an insulating cover portion 120 taken along section line A-A (see FIG. 1), according to a preferred embodiment of the present invention; and, FIG. 5 is an electrical block diagram of the solar-powered thermal insulating tape 10, according to a preferred embodiment of the present invention.

Referring now to FIG. 4, a section view of an insulating cover portion 120 taken along section line A-A (see FIG. 1), according to a preferred embodiment of the present invention, is disclosed. An insulating cover 120 is to be applied thereto an outside surface of the heat tape unit 50 once installed thereupon the equipment 100 to provide a means to retain and direct heat generated by the heat tape unit 50 toward the equipment 100 being protected. The insulating cover 120 comprises an insulating layer 122 and a water-proof sealing tape layer 125. The insulating layer 122 is to be in direct contact therewith the equipment 100 and heat tape unit 50. The insulating layer 122 preferably comprises common fiberglass batt material; however, other equivalent pliable materials capable of being wrapped tightly around said equipment 100 such as polyethylene or neoprene foam sheets, rockwool, or the like, may also be utilized. The sealing tape layer 125 comprises an adhesive backed plastic or metalized tape which provides a means to secure the insulating layer 122 thereto the equipment 100 as well as provide a water-proof outer layer over the insulating cover 120.

Figure 5:
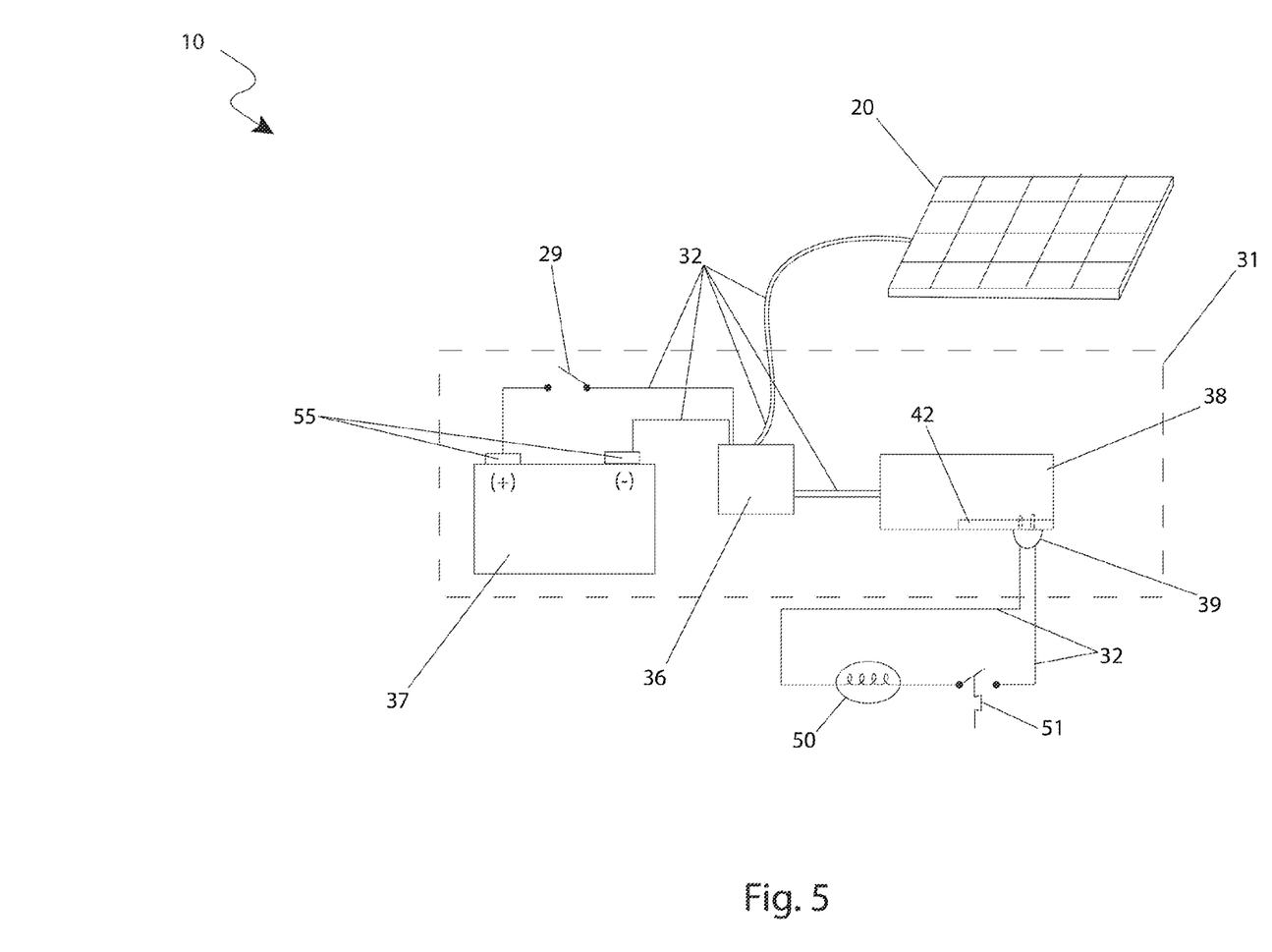

Referring now to FIG. 5, an electrical block diagram of the system 10, according to a preferred embodiment of the present invention, is disclosed. The system 10 provides a voltage conditioning means and an electrical storage means therewithin an enclosure 31. The system 10 may be disabled manually via a common ON/OFF switch 29 to open the battery 37 portion of the circuitry. The solar panel 20 produces a variable DC voltage in a conventional manner ranging between approximately sixteen (16) and twenty (20) volts, which is conducted via common wiring 32 thereto a charge controller 36 which regulates and delivers a steady charging voltage of approximately fourteen (14) volts thereto the battery 37. The battery 37 in turn provides a consistent 12-volt output current thereto a power inverter 38. The inverter 38 converts the received 12-volt DC power thereinto 110-volt AC power to be utilized thereby the heat tape unit 50. Once the ambient air temperature drops below a pre-set threshold temperature established by the thermal switch 51, said thermal switch 51 closes, thereby enabling the 110-volt current to flow therefrom the inverter 38 to the heat tape unit 50, thereby preventing freezing of protected equipment 100. The system 10 may be manually disabled using the ON/OFF switch 29 to electrically isolate the battery 37 during warm seasons if so desired.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the system 10, it would be installed as indicated in FIG. 1.

The method of installing and utilizing the system 10 may be achieved by performing the following steps: selecting a location at which to install the system 10 being in close proximity thereto particular equipment 100 to be protected therefrom freezing such as, but not limited to: pressure regulators, valves, miscellaneous plumbing, and the like; installing the mast portion 25 therein a grade surface 110 being buried two (2) to three (3) feet deep based upon anticipated frost conditions; pre-assembling the azimuth adjustment bracket 60 and the panel mounting arm 22 thereto the solar panel 20 using the panel brackets 23; insertingly placing the azimuth adjustment bracket portion 60 thereonto a top end portion of the mast 25; adjusting a directional position of the solar panel 20 in a radial manner along a horizontal plane by rotating the azimuth adjustment bracket 60 thereupon said mast 25; securing the position of the azimuth adjustment bracket 60 and solar panel 20 by tightening the locking fastener portion 68 of said azimuth adjustment bracket 60; adjusting an azimuth angle of the solar panel 20 by pivoting a lower portion of the panel mounting arm 22 in a forward and rearward motion within the azimuth adjustment bracket 60 to maximize solar collection; securing the panel mounting arm 22 by tightening the opposing locking fasteners 68; pre-assembling the power distribution box 30 by installing and wiring the charge controller 36, the inverter 38, and the battery 37 therewithin the enclosure portion 31, if not previously assembled; mounting the power distribution box 30 thereto the mast 25 using the provided box mounting fixtures 27; routing and connecting all interconnecting wiring 32; wrapping the heat tape unit 50 therearound said equipment 100 in a non-crossing spiral pattern; wrapping the insulating layer 122 around the equipment 100 and over the wrapped portion of the heat tape unit 50; positioning the thermal switch portion 51 outside the insulating cover 120 being exposed thereto the ambient air; securing and water-proofing said insulating layer 122 by applying the self-adhesive sealing tape layer 125 therearound; routing a male plug portion 39 of the heat tape unit 50 thereinto the enclosure 31 and inserting the male plug portion 39 of the heat tape unit 50 thereinto the electrical outlet portion 42 of the inverter 38; securing the access door portion 40 of the enclosure 31 using the hasp 35 and lock 33; and, moving the ON/OFF switch 29 thereto the "ON" position. The system 10 is now fully operational providing an electric current thereto the heat tape unit 50 upon closure of the thermal switch 51 based upon a surrounding ambient air temperature. The system 10 may now be utilized to provide automatic solar powered freezing protection of remotely located equipment 100.

The method of utilizing electricity generated thereby the system 10 to temporarily power other electrical devices may be achieved by performing the following steps: opening the access door portion 40 of the enclosure 31; inserting a plug portion of an electrical device thereinto the electrical outlet portion 42 of the inverter 38; and, utilizing various electrical devices thereat a remote location such as testing equipment, telemetry equipment, power repair equipment, and the like, as needed.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. An insulating and protective means for a device, comprising:
    an energy collection and distribution means, comprising:
        a mast;
        a solar panel;
    an azimuth adjustment bracket located at a top end of said mast, comprising:
        a panel mounting arm;
        an upper portion comprising a channel-shaped bracket having two (2) upwardly extending opposing leg portions;
        a pivot pin extending horizontally through said azimuth adjustment bracket and said panel mounting arm;
        a pair of locking fasteners inserted through a pair of diametrically opposed adjustment slots; and,
        a lower portion comprising a bottom opening receiving said top end of said mast and having a radial adjustment fastener;
    wherein said panel mounting arm provides an attachment means for said solar panel to said azimuth adjustment bracket; and,
    a power distribution box in electrical communication with said solar panel and mounted at an intermediate position on said mast, further comprising a securable enclosure; and,
    at least one electrical heat tape in electrical communication with said energy collection and distribution means;
    wherein said solar panel collects thermal energy and converts said thermal energy to electrical energy and transmits said electrical energy to said power distribution box;
    wherein said azimuth adjustment bracket provides selectable directional adjustment and positioning of said solar panel, further comprising angular positioning with respect to a vertical center via said pivot pin and secured with said pair of locking fasteners;
    wherein said selectable directional adjustment and positioning of said solar panel further comprises radial positioning along a horizontal plane via rotating of said azimuth adjustment bracket and securing with said radial adjustment fastener;
    wherein said angular positioning and said radial positioning maximizes collection of solar energy;
    wherein said power distribution box provides electrical power from said electrical energy and distributes electrical power to said at least one electrical heat tape;
    wherein said at least one electrical heat tape is placed on said device to provide said insulating and protective means; and,
    wherein said insulating and protective means provides a stand-alone thermal protection to said device.

2. The insulating and protective means of claim 1, wherein said solar panel further comprises a rectangular photovoltaic unit rated at approximately 80 Watts.

3. The insulating and protective means of claim 1, wherein said panel mounting arm further comprises:
    a "Y"-shape body extending upwardly along a rear surface of said solar panel secured to outer rear surfaces of said solar panel with a plurality of panel brackets affixed thereto using fasteners.

4. The insulating and protective means of claim 1, wherein said power distribution box further comprises:
    said enclosure further comprising:
        an access door comprising a side-hinged panel having a water-proof seal and a hasp located along a bottom edge for providing access into an interior;
        a locking unit in operable conjunction with said hasp to maintain said access door in a closed state; and,
        mounting fixtures for mounting said enclosure to said mast;
    a charge controller mounted in said interior in electrical communication with said solar panel;
    a battery mounted in said interior in electrical communication with said solar panel;
    an inverter mounted in said interior in electrical communication with said solar panel, further comprising an integral electrical outlet; and,
    a power switch in electrical communication with said inverter and said battery;

wherein said charge controller provides regulation of variable input voltage from said solar panel to a constant 12-volt direct current voltage to said battery and said inverter;

wherein said inverter provides said electrical power by converting said constant direct current voltage into 110-volt alternating current voltage;

wherein at least one electrical heat tape is removably electrically connected to said duplex electrical outlet; and, wherein said power switch provides a selectable distribution of said electrical power.

5. The insulating and protective means of claim 4, wherein said inverter comprises an approximate power rating of four-hundred Watts.

6. The insulating and protective means of claim 1, wherein said at least one electrical heat tape further comprises a resistor wire-type heating cable with an in-line thermal switch.

7. The insulating and protective means of claim 6, wherein said at least one electrical heat tape each comprises a power consumption rating of approximately eighty Watts.

8. The insulating and protective means of claim 1, further comprising an insulating cover applied to an outside surface of said at least one electrical heat tape, further comprising:
   an insulating layer comprising a pliable material capable of being wrapped tightly around said device; and,
   a water-proof sealing tape layer comprising an adhesive-backed plastic or metallized tape which provides a means to secure said insulating layer to and a water-proof outer layer over said insulating cover.

9. The insulating and protective means of claim 8, wherein said pliable material further comprises one of the following list: fiberglass, polyethylene, neoprene foam sheet, and rockwool.

10. An insulating and protective means for a device, comprising:
   an energy collection and distribution means, comprising:
      a mast;
      a solar panel;
      a panel mounting arm, comprising a "Y"-shape body extending upwardly along a rear surface of said solar panel secured to outer rear surfaces of said solar panel with a plurality of panel brackets affixed thereto using fasteners;
      an azimuth adjustment bracket located at a top end of said mast, comprising:
         an upper portion comprising a channel-shaped bracket having two (2) upwardly extending opposing leg portions;
         a pivot pin extending horizontally through said azimuth adjustment bracket and said panel mounting arm;
         a pair of locking fasteners inserted through a pair of diametrically opposed adjustment slots; and,
         a lower portion comprising a bottom opening receiving said top end of said mast and having a radial adjustment fastener; and,
      a power distribution box in electrical communication with said solar panel and mounted at an intermediate position on said mast, further comprising a securable enclosure;
   wherein said panel mounting arm provides an attachment means for said solar panel to said azimuth adjustment bracket;
   at least one electrical heat tape in electrical communication therewith said energy collection and distribution means, further comprising a resistor wire-type heating cable with an in-line thermal switch; and,
   an insulating cover applied thereto an outside surface of said at least one electrical heat tape, further comprising an insulating layer comprising a pliable material capable of being wrapped tightly around said device and a water-proof sealing tape layer comprising an adhesive-backed plastic or metallized tape which provides a means to secure said insulating layer thereto and a water-proof outer layer over said insulating cover;
   wherein said solar panel collects thermal energy and converts said thermal energy to electrical energy and transmits said electrical energy to said power distribution box;
   wherein said azimuth adjustment bracket provides selectable directional adjustment and positioning of said solar panel;
   wherein said selectable directional adjustment and positioning of said solar panel further comprises angular positioning with respect to a vertical center via said pivot pin and secured with said pair of locking fasteners;
   wherein said selectable directional adjustment and positioning of said solar panel further comprises radial positioning along a horizontal plane via rotating of said azimuth adjustment bracket and securing with said radial adjustment fastener;
   wherein said angular positioning and said radial positioning maximizes collection of solar energy;
   wherein said power distribution box provides said electrical power from said electrical energy to said at least one electrical heat tape;
   wherein said at least one electrical heat tape is placed on said device to provide said insulating and protective means; and,
   wherein said insulating and protective means provides a stand-alone thermal protection to said device.

11. The insulating and protective means of claim 10, wherein said power distribution box further comprises:
   said enclosure further comprising:
      an access door comprising a side-hinged panel having a water-proof seal and a hasp located along a bottom edge for providing access into an interior;
      a locking unit in operable conjunction with said hasp to maintain said access door in a closed state; and,
      mounting fixtures for mounting said enclosure to said mast;
   a charge controller mounted in said interior in electrical communication with said solar panel;
   a battery mounted in said interior in electrical communication with said solar panel;
   an inverter mounted in said interior in electrical communication with said solar panel, further comprising an integral electrical outlet; and,
   a power switch in electrical communication with said inverter and said battery;
   wherein said charge controller provides regulation of variable input voltage from said solar panel to a constant 12-volt direct current voltage to said battery and said inverter;
   wherein said inverter provides said electrical power by converting said constant direct current voltage into 110-volt alternating current voltage;
   wherein at least one electrical heat tape is removably electrically connected to said duplex electrical outlet; and,
   wherein said power switch provides a selectable distribution of said electrical power.

12. The insulating and protective means of claim 10, wherein said solar panel further comprises a rectangular photovoltaic unit rated at approximately 80 Watts.

13. The insulating and protective means of claim 11, wherein said inverter comprises an approximate power rating of four-hundred Watts.

14. The insulating and protective means of claim 10, wherein said at least one electrical heat tape each comprises a power consumption rating of approximately eighty Watts.

15. The insulating and protective means of claim 10, wherein said pliable material further comprises one of the following list: fiberglass, polyethylene, neoprene foam sheet, and rockwool.

16. A method for remotely insulating and protecting a device with a stand-alone system comprises the following steps:
providing an energy collection and distribution means, further comprising:
a mast;
a rectangular solar panel;
an azimuth adjustment bracket, further comprising:
an upper portion comprising a channel-shaped bracket having two (2) upwardly extending opposing leg portions;
a pivot pin extending horizontally through said azimuth adjustment bracket and said panel mounting arm;
a pair of locking fasteners inserted through a pair of diametrically opposed adjustment slots; and,
a lower portion comprising a bottom opening receiving a top end of said mast and having a radial adjustment fastener;
a panel mounting arm providing an attachment means for said solar panel to said azimuth adjustment bracket, further comprising a "Y"-shape body extending upwardly along a rear surface of said solar panel secured to outer rear surfaces of said solar panel with a plurality of panel brackets affixed to using fasteners; and,
a power distribution box in electrical communication with said solar panel and mounted at an intermediate position on said mast, further comprising:
a securable enclosure further comprising an access door comprising a side-hinged panel having a water-proof seal and a hasp located along a bottom edge for providing access into an interior, a locking unit in operable conjunction with said hasp to maintain said access door in a closed state, and mounting fixtures for mounting said enclosure to said mast;
a charge controller mounted in said interior in electrical communication with said solar panel;
a battery mounted in said interior in electrical communication with said solar panel;
an inverter mounted in said interior in electrical communication with said solar panel, further comprising an integral electrical outlet; and,
a power switch in electrical communication with said inverter and said battery;
providing at least one electrical heat tape, each further comprising:
a resistor wire-type heating cable with an in-line thermal switch; and,
an insulating cover applied to an outside surface of said at heating cable, further comprising an insulating layer comprising a pliable material capable of being wrapped tightly around said device and a water-proof sealing tape layer comprising an adhesive-backed plastic or metallized tape which provides a means to secure said insulating layer to and a water-proof outer layer over said insulating cover;
selecting a location at which to install said system being in close proximity to said device to be protected and insulated;
installing said mast portion in a grade surface being buried approximately two to three feet deep based upon anticipated frost conditions;
assembling said azimuth adjustment bracket and said panel mounting arm in said solar panel using said plurality of panel brackets;
insertingly placing said azimuth adjustment bracket onto said top end of said mast;
adjusting a radial position of said solar panel along a horizontal plane by rotating said azimuth adjustment bracket upon said mast to maximize collection of solar energy;
securing said radial position of said a solar panel by tightening said radial adjustment fastener of said azimuth adjustment bracket;
adjusting an angular position of said solar panel by pivoting a lower portion of said panel mounting arm in a forward and rearward motion within said azimuth adjustment bracket to maximize collection of solar energy;
securing said angular position by tightening said pair of locking fasteners;
mounting said power distribution box to an intermediate location along said mast with said mounting fixtures;
routing and connecting all electrical wiring from said solar panel to said power distribution box;
wrapping said at least one electrical heat tape unit around said device;
wrapping said insulating layer around said device and said at least one electrical heat tape;
positioning said in-line thermal switch outside of said insulating cover to expose said in-line thermal switch to ambient elements;
securing and water-proofing said insulating layer by applying said sealing tape layer around said insulating layer;
routing a plug portion of said at least one electrical heat tape unit into said enclosure and inserting into said electrical outlet of said inverter;
routing a plug portion of an additional electrical device into said enclosure and inserting into said electrical outlet of said inverter
securing said access door of said enclosure; and,
moving said power to an "ON" position, thereby transferring electrical energy from said solar panel to said charge controller, wherein said charge controller transfers said electrical energy to said battery and said inverter, wherein said inverter coverts said electrical energy into electrical power, wherein said electrical power is transferred to said at least one electrical heat tape for providing insulating and protective means to said device as controlled by said in-line thermal switch.

\* \* \* \* \*